United States Patent [19]

Malm

[11] 4,290,140

[45] Sep. 15, 1981

[54] COMBINED COHERENT FREQUENCY AND PHASE SHIFT KEYING MODULATION SYSTEM

[75] Inventor: Robert Malm, Pacific Palisades, Calif.

[73] Assignee: Northrop Corporation, Los Angeles, Calif.

[21] Appl. No.: 50,795

[22] Filed: Jun. 21, 1979

Related U.S. Application Data

[63] Continuation-in-part of Ser. No. 880,631, Feb. 23, 1978, abandoned.

[51] Int. Cl.³ .................... H04L 27/18; H04L 27/10
[52] U.S. Cl. ........................ 375/46; 375/79; 375/82; 375/91
[58] Field of Search .............. 375/45, 46, 41, 42, 375/44, 52, 56, 58, 62, 67, 78, 79, 82; 179/1 BM; 332/9 R, 16 R, 22; 371/8, 68

[56] References Cited

U.S. PATENT DOCUMENTS

| | | | |
|---|---|---|---|
| 3,223,779 | 12/1965 | McFarlane | 375/46 |
| 3,223,925 | 12/1965 | Florac | 332/22 |
| 3,617,889 | 11/1971 | Rabinowitz | 375/46 |
| 3,619,503 | 11/1971 | Ragsdale | 375/42 |
| 3,699,479 | 10/1972 | Thompson | 332/22 |
| 3,750,051 | 7/1973 | Brady | 375/46 |
| 4,003,003 | 1/1977 | Heaberlin | 375/46 |

*Primary Examiner*—Marc E. Bookbinder
*Assistant Examiner*—Michael A. Masinick
*Attorney, Agent, or Firm*—Edward A. Sokolski

[57] ABSTRACT

A system of modulation and demodulation for the transmission of binary data in the presence of multipath. The binary data modulates the phase of the carrier and the same binary data, after a delay of "δ" bits, also modulates the frequency of the carrier. Following reception, the binary data is obtained either by frequency demodulation or by a method of coherent phase shift demodulation wherein the mark or the space frequency is selected for detection of each bit in accord with the bit received "n" bits previously. The system selects between the demodulation methods to obtain one which operates satisfactorily in the instant electromagnetic environment.

6 Claims, 7 Drawing Figures

COMBINED COHERENT FREQUENCY AND PHASE SHIFT KEYING MODULATION SYSTEM

This application is a continuation-in-part of my Application Ser. No. 880,631, filed Feb. 23, 1978, and now abandoned.

BACKGROUND OF THE INVENTION

A. Field of the Invention

This invention relates to systems and method for modulating and demodulating electromagnetic carriers for the transmission of binary digital data, and more particularly to such a system and method which employ a combination of frequency and phase shift keying.

B. Description of the Prior Art

The four basic binary modulation-demodulation techniques generally used for communicating binary digital data are:

CPSK—coherent phase shift keying
DCPSK—differentially coherent phase shift keying
CFSK—coherent frequency shift keying
NCFSK—non-coherent frequency shift keying The CPSK technique associates a binary "0" with the transmission of a carrier with some reference phase during the bit period. A binary "1" is associated with the transmission of a carrier with the phase shifted by 180° from the reference. The demodulation process is accomplished by deriving a phase reference at the receiver and comparing the phase of the received carrier with the reference during each bit period to determine whether a "0" or a "1" was transmitted.

The DCPSK technique associates a "0" with no change in carrier phase from the previous bit period. A "1" is associated with a change of 180° in carrier phase from the previous bit period. The demodulation process compares the phase of the carrier during the present bit period with what it was during the previous bit period and thereby establishes whether a "0" or "1" was transmitted.

The CFSK and NCFSK techniques associate a "0" with the transmission of a "space" frequency and a "1" with the transmission of a "mark" frequency. The demodulation processes for both techniques involve the identification of the received frequency as either a "mark" or "space" frequency during each bit period. The CFSK demodulation process assumes that the transmitted carrier phase can be and is modeled at the receiver and the phase information obtained in this way is used in the demodulation process to achieve improved performance. The NCFSK demodulation process assumes that the transmitted carrier phase cannot be modeled at the receiver and the frequency identification is therefore made without benefit of phase information.

When the propagation path is relatively stable, the CPSK technique offers the best performance. However, if the presence of multipath causes the phase of the received carrier to be unreliable, the performance of NCFSK is superior in performance to the other modulation systems described above because it is independent of the phase of the received signal. Accordingly, in order that a communication system perform relatively well in both high and low multipath environments, means could be employed to use CPSK modulation and demodulation during periods of high phase stability, and to use NCFSK during periods of low phase stability. By combining an NCFSK system and a CPSK system, the transmitting unit and receiving unit could be switched, in synchronism, from one mode of operation to the other to utilize whichever mode functioned best at the particular moment. However, a simple combination of such prior art systems would require that a signal be sent from the receiving terminal to the transmitting terminal to periodically provide information as to which modulation mode was preferable.

SUMMARY OF THE PRESENT INVENTION

The system of this invention incorporates a hybrid frequency and phase modulation technique, together with adaptive demodulation by the receiving unit, to allow the receiving unit to select, independently of the transmitting terminal, whichever of two methods of demodulation will perform better under the particular operating conditions at hand. One of the demodulation modes is similar in operation and performance to CPSK while the other is similar in operation and performance to NCFSK. No communication from the receiving unit to the transmitting unit is required and the modulation method used by the transmitting unit remains constant regardless of the demodulation method selected at the receiving unit.

The hybrid frequency and phase modulation system of the present invention is referred to herein as "coherent frequency and phase shift keying" ("CFPSK"). In this system the transmitted carrier is shifted, both in phase and in frequency, by the input data. At a given instant, the phase of the carrier is determined by the input binary digit (bit), 0° carrier phase corresponding to a "0" and 180° carrier phase corresponding to a "1". The frequency of the carrier is controlled by a previous bit in the string of data, which bit precedes the instant bit by "$\delta$" periods, where "$\delta$" is an arbitrary but fixed integer. A "0" for the previous bit corresponds to a "space" frequency, and a "1" corresponds to a "mark" frequency. Thus, at any given moment the transmitted carrier is in one of four states, i.e., 0° or 180° phase on either the space or mark frequency. The four states, however, are not unrelated since the frequency of the carrier at any moment is related to the phase of the carrier during the bit period which precedes the present bit by "$\delta$" bit periods.

The receiving unit operates in either of two modes, depending upon which mode operates better under the electromagnetic propagation conditions at hand. During unstable phase conditions, the receiver ignores the phase of the received signal and demodulates the carrier in a manner similar to that used in a non-coherent frequency shift keying system, that is, the state of the received bit is determined in accord with whichever of the space or mark frequencies exhibits the stronger signal.

During periods of relative phase stability, a system of demodulation is used which is similar to that used in coherent phase shift keying systems and is referred to hereinafter as "quasi-CPSK demodulation". At the receiver, the space or mark frequency is selected for examination in accord with the bit received "$\delta$" data periods earlier. The signal received at the selected frequency is then compared with a local phase reference to determine whether the phase of the received signal corresponds to a "0" or "1" data bit. The phase comparison is performed by any of the means used in conventional CPSK systems. Thus, once a data bit has been successfully detected, the receiver uses this information, a fixed number of bit periods later, to determine which of the two frequencies should be demodulated to obtain the subsequent data bit.

The system of this invention also provides for the improvement of the performance of the quasi-CPSK demodulation system by means of the modification of the system whenever it is likely that the mark or space frequency will be incorrectly selected. An indicator of the likelihood of error can be derived from any of a number of sources, as will become apparent in the following description.

Because an error in the demodulation of a data bit will cause, at a later time, the incorrect selection of the space or mark frequency for demodulation, the quasi-CPSK demodulation system exhibits a slightly higher error rate than a true CPSK system for any given signal-to-noise ratio. This difference in performance, however, can be minimized by a modification of the demodulation process whenever there is a high likelihood of errors. The modification may take any of a number of different forms, two of which are described here. In Modification "A", the outputs from the phase demodulators for the space and mark frequencies are combined and then examined to determine the state of the received data bit. Thus, in Modification "A", the combined channels are used to determine the state of the received bits and hence the string of data output by the demodulator. In Modification "B", the combined output of the demodulators is used only to determine which one of the two frequencies is to be examined "$\delta$" bit periods later, to determine the actual state of the received data bit. Further improvements in the system's operation are obtained if the data is transmitted in coded groups of bits rather than as a sequence of unrelated bits.

DESCRIPTION OF THE PREFERRED EMBODIMENT

Figure 1:
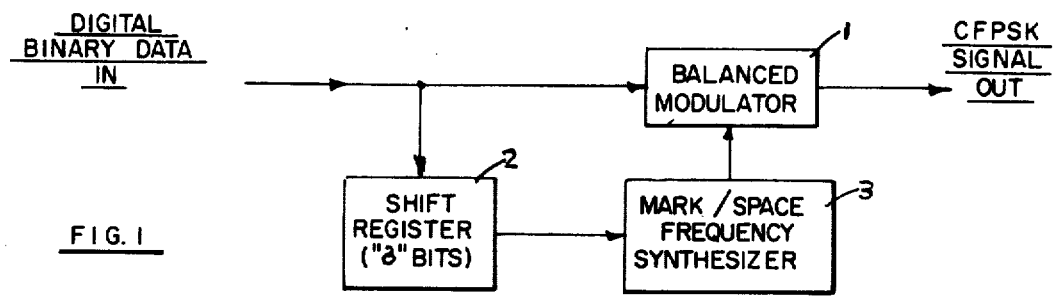
FIG. 1 is a block diagram showing means for generating CFPSK modulation in the system of the invention.
Figure 2:
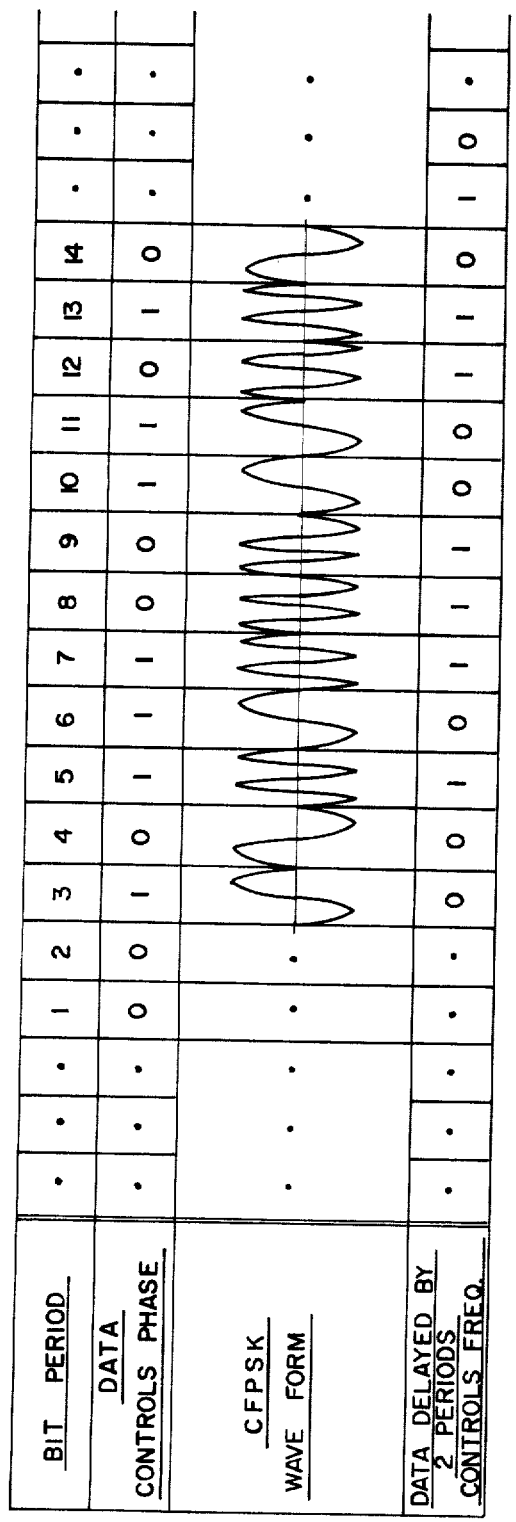
FIG. 2 is a waveform drawing illustrating the manner in which the frequency and phase of the radio frequency carrier are modulated in the system of the invention.

A means for generating a CFPSK signal is illustrated in FIG. 1. Digital binary data is input to the balanced modulator 1 and to the shift register 2 where the data is delayed "$\delta$" bits. The mark/space frequency synthesizer 3 generates a mark or space frequency as directed by the output of the shift register 2. The phase of the mark or space frequency generated by the synthesizer is shifted by zero or 180 degrees in the balanced modulator 1 and then output as the CFPSK signal. FIG. 2 illustrates the format of the CFPSK signal for $\delta=2$. The phase of the signal is controlled by the instant binary digit (bit) while the instant frequency of the signal is controlled by the bit occurring two bit periods earlier. With the exception of the 180° phase shifts dictated by the stream of data, the phases of the space and mark frequencies are each coherent. For simplicity of operation, the difference between the mark and space frequencies should be selected to be a multiple of the keying rate.

Figure 3:
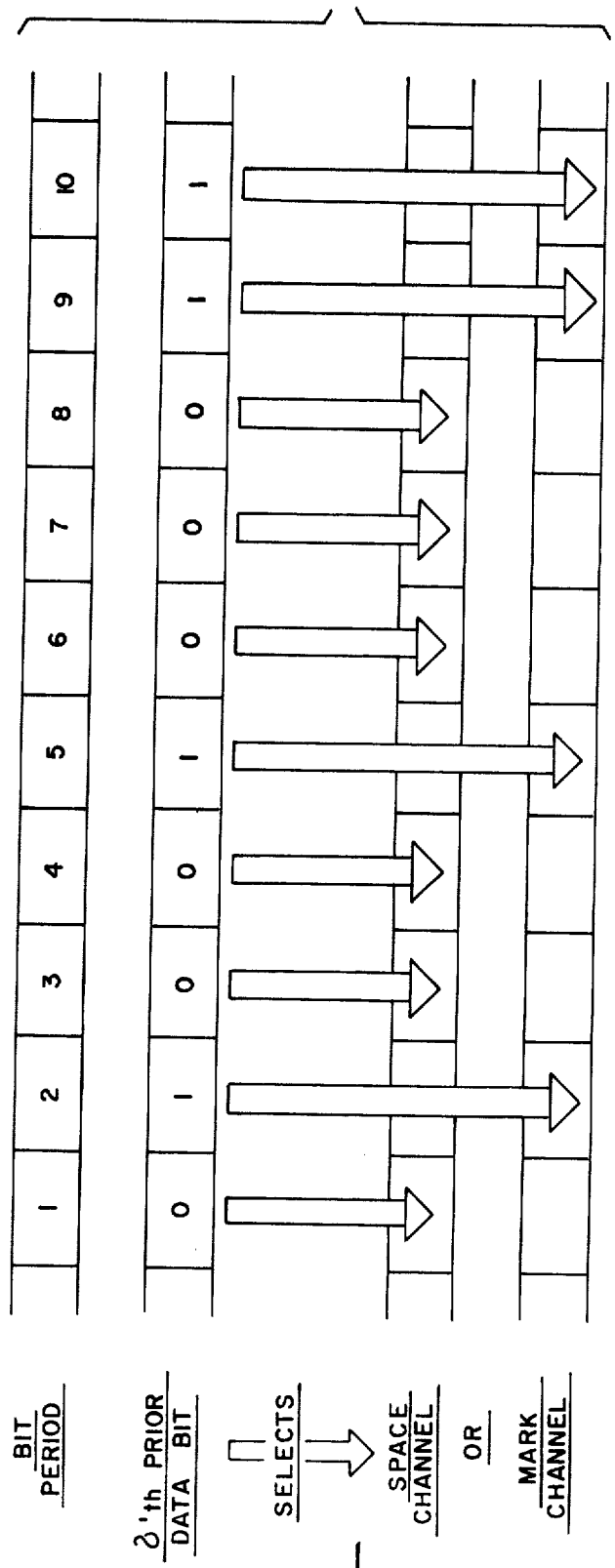
FIG. 3 diagrammatically illustrates the selection of the mark or space frequency for demodulation of the binary data in accord with the state of the bit detected "$\delta$" bit periods previously.

Referring to FIG. 3, the received data, after a delay of two bit periods (or some other fixed number of periods), is used to select the space or the mark frequency for examination to determine the state of the bit being presently received.

Figure 4:
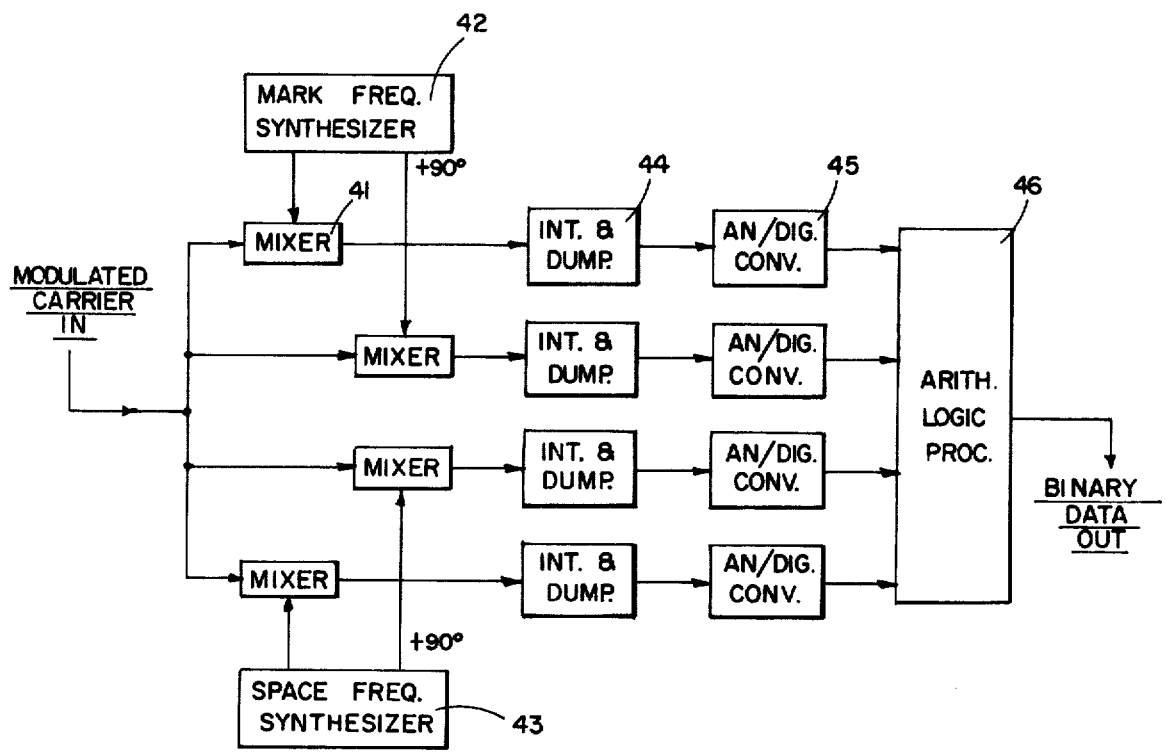
FIG. 4 is a block diagram of the CFPSK demodulator of the invention.

FIG. 4 illustrates a preferred embodiment of the CFPSK demodulator. Following reception, the modulated carrier is applied simultaneously to four mixers 41. A mark frequency, generated by the mark frequency synthesizer 42, is applied with zero phase to one of the mixers 41, and, with its phase shifted 90°, to a second mixer. The space frequency, from the space frequency synthesizer 43, is supplied to a third mixer with zero phase, and to the fourth mixer with a 90° phase shift. The outputs of each of the four mixers are integrated individually by the four integrators and dumpers 44 and the integrals dumped into the four analog-to-digital converters 45. The outputs of the four analog-to-digital converters 45 are proportional to the in-phase and quadrature components of the signals received on the space and mark frequencies. ($M_i$ and $S_i$ denote the in-phase components at the mark and space frequencies respectively, and $M_q$ and $S_q$ denote the quadrature components.) The four components are processed within the arithmetic logic processor 46 to detect the binary data. The MCS-6500 microprocessor made by MOS Technology is suitable for use as the arithmetic logic processor 46. Any of a number of other microprocessors, such as the SY-6500/MCS-6500 made by Synertek or the Motorola 6080, could alternatively be used as the microprocessor. In each case, the microprocessor is programmed to execute the equations described below.

There are a number of methods which may be used to derive a phase reference $\theta_r(h)$ at each of the space and mark frequencies. The method described here will track both phase and frequency with zero error when the time rate of change of phase is constant. The reference phase for either the space or mark frequency is given by:

$$\theta_r(h) = (1/K_1)H(h) \tag{1}$$

where h is an integer which denotes the keying interval and $K_1$ is a constant which determines the amount of smoothing of the phase. H(h) is then calculated in the following manner:

$$H(h) = H(h-1) + \dot{H}(h-1) + \Delta\theta'(h-1). \tag{2}$$

$\dot{H}$ denotes the change of H from one keying interval to the next as determined by the difference between $H(h-1)$ and $H(h-2)$ as given by $$\dot{H}(h) = \dot{H}(h-1) + (1/K_2)[H(h-1) - H(h-2) - \dot{H}(h-1)] \tag{3}$$

The constant $K_2$ determines the amount of smoothing of the time rate of change phase. In order to avoid $\pi$ radian ambiguities in the phase reference, the process must be initiated with an unmodulated carrier in which case $$\Delta\theta(h) = \begin{cases} \Delta\theta(h) - 2\pi & ; \pi < \Delta\theta(h) \leq 2\pi \\ \Delta\theta(h) & ; -\pi < \Delta\theta(h) \leq \pi \\ \Delta\theta(h) + 2\pi & ; -2\pi < \Delta\theta \leq -\pi \end{cases} \quad (4)$$

where $$\Delta\theta'(h) = [\theta_{m/s}(h) - \theta_r(h)]_{mod\ 2\pi} \quad (5)$$

and $\theta_{m/s}$ is the phase of the received signal on the respective space or mark frequency.

After modulation of the carrier commences, $\Delta\theta'(h)$ is given by:

$$\Delta\theta'(h) = \begin{cases} \Delta\theta(h) - 2\pi & ; \frac{3\pi}{2} < \Delta\theta(h) \leq 2\pi \\ \Delta\theta(h) - \pi & ; \frac{\pi}{2} < \Delta\theta(h) < \frac{3\pi}{2} \\ \Delta\theta(h) & ; -\frac{\pi}{2} < \Delta\theta(h) \leq \frac{\pi}{2} \\ \Delta\theta(h) + \pi & ; -\frac{3\pi}{2} < \Delta\theta(h) \leq -\frac{\pi}{2} \\ \Delta\theta(h) + 2\pi & ; -2\pi < \Delta\theta(h) \leq -\frac{3\pi}{2} \end{cases} \quad (6)$$

The above definition of $\Delta\theta'(h)$ serves to remove the phase modulation from the carrier for the purpose of maintaining a phase reference.

The operation of the arithmetic logic processor ("ALP") 46 can be described by the following equations.

The amplitude and phase of the mark signal ($A_m$ and $\theta_m$), of the space signal ($A_s$ and $\theta_s$), and of the combined mark and space signals ($A_{ms}$ and $\theta_{ms}$) respectively, are given by:

$$A_m = \sqrt{M_I^2 + M_q^2} \quad (7)$$

$$\theta_m = \tan^{-1}(M_q/M_I) \quad (8)$$

$$A_s = \sqrt{S_I^2 + S_q^2} \quad (9)$$

$$\theta_s = \tan^{-1}(S_q/S_I) \quad (10)$$

$$A_{ms} = \sqrt{(M_I + S_I)^2 + (M_q + S_q)^2} \quad (11)$$

$$\theta_{ms} = \tan^{-1}[(M_q + S_q)/(M_I + S_I)] \quad (12)$$

The angles are constrained to lie between $-\pi$ and $+\pi$ radians.

The arithmetic logic processor performs the quasi-CPSK demodulation as follows: The state of the received demodulated bit, $B_r(j)$, for the jth bit period is determined as follows:

$$B_r(j) = \begin{cases} 0 & ; |\Delta\theta'_{m/s}(j)| \leq \frac{\pi}{2} \\ 1 & ; |\Delta\theta'_{m/s}(j)| > \frac{\pi}{2} \end{cases} \quad (13)$$

where $$\Delta\theta'_{m/s}(j) = \begin{cases} \Delta\theta_{m/s}(j) - 2\pi & ; \pi < \Delta\theta_{m/s}(j) \leq 2\pi \\ \Delta\theta_{m/s}(j) & ; -\pi < \Delta\theta_{m/s}(j) \leq \pi \\ \Delta\theta_{m/s}(j) + 2\pi & ; -2\pi < \Delta\theta_{m/s}(j) \leq -\pi \end{cases} \quad (14)$$

and $$\Delta\theta_{m/s}(j) = [\theta_{m/s}(j) - \theta_r(j)]_{mod\ 2\pi} \quad (15)$$

$\theta_{m/s}$ represents the phase of the signal detected in the mark or space channel, whichever has been selected in the manner previously described. $\theta_r$ is the corresponding phase reference.

The portion of the arithmetic logic processor which performs the frequency demodulation analogous to NCFSK demodulation can be described mathematically as the following:

$$B_r(j) = \begin{cases} 0 & ; A_m(j) \leq A_s(j) \\ 1 & ; A_m(j) > A_s(j) \end{cases} \quad (16)$$

Depending upon propagation conditions, the arithmetic logic processor generates output data bits, $B_r(j)$ either in accord with equation (13) as a quasi-CPSK demodulator, or in accord with equation (16) as a frequency demodulator.

Figure 5:
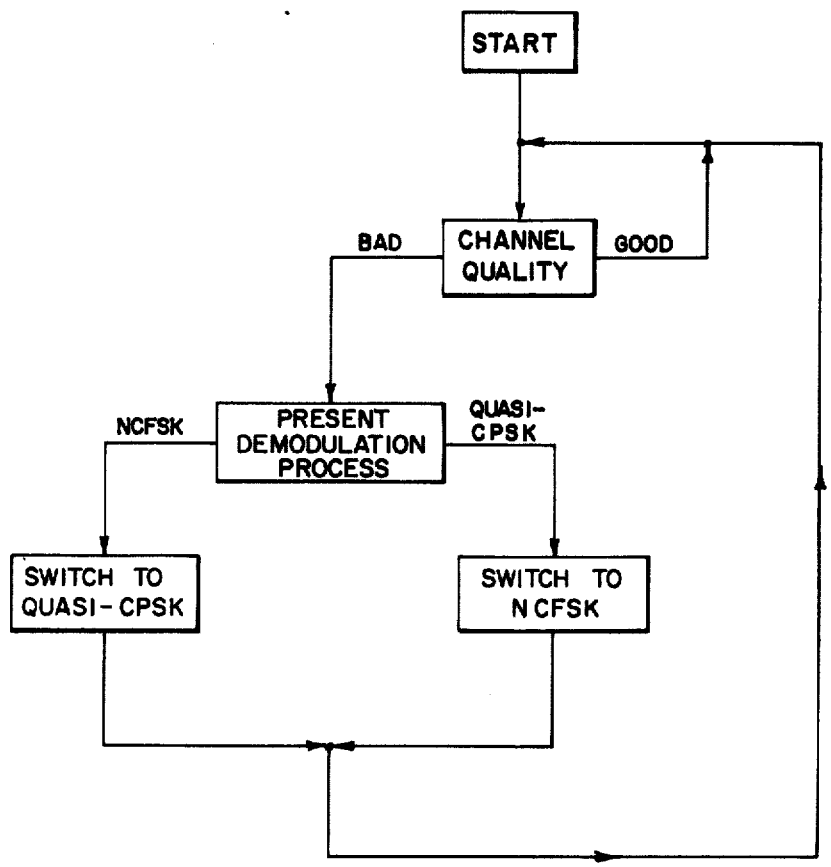
FIG. 5 is a flow diagram of the logic implemented in the Arithmetic Logic Processor to select the method of demodulation.

FIG. 5 contains a flow diagram of the logical process mechanized in the ALP to select between the two demodulation methods. Whenever the channel quality drops below a predetermined level the ALP switches from whatever method of modulation is in use to the other method. The measure of channel quality is based on the fraction of a selected period of time during which the error predictor indicates that errors are likely.

In addition, whenever the error predictor indicates that it is sufficiently likely during the next bit period that the quasi-CPSK demodulator may incorrectly select the mark or the space channel for demodulation, the operation of the ALP as described by equation (13) is modified so that the outputs from the analog to digital converter 45 in FIG. 4 are combined prior to detection, that is, $\theta'_{m/s}(j)$ in equation (13) is replaced by $\theta'_{ms}(j)$.

The detected bit, $B_r(j)$, is then used in either of two ways. In uncoded modification "A", the ALP generates output data in accord with $B_r(j)$, while in uncoded modification "B", each of the $B_r(j)$, is used "$\delta$" bit periods later, to select the mark or the space frequency which is then demodulated in a quasi-CPSK manner to generate the output data.

Although an error predictor may be obtained from any of a number of sources, the error predictor, $P(j)$, for the quasi-CPSK demodulator in the preferred embodiment can be described by the following equations:

$$P(j) = \begin{cases} 0 & ; |A_c(j) \cos[\theta_c(j) - \theta_r(j)]| \geq \Delta \cdot R \\ 1 & ; |A_c(j) \cos[\theta_c(j) - \theta_r(j)]| < \Delta \cdot R \end{cases} \quad (17)$$

where $A_c$ and $\theta_c$ are given by:

$$Ac(j) = \begin{cases} A_s(j) & ; \begin{array}{l} P(j-\delta) = 0 \\ B_t(j-\delta) = 0 \end{array} \\ A_m(j) & ; \begin{array}{l} P(j-\delta) = 0 \\ B_t(j-\delta) = 1 \end{array} \\ A_{ms}(j) & ; P(j-\delta) = 1 \end{cases} \quad (18)$$

$$\theta c(j) = \begin{cases} \theta_s(j) & ; \begin{array}{l} P(j-\delta) = 0 \\ B_t(j-\delta) = 0 \end{array} \\ \theta_m(j) & ; \begin{array}{l} P(j-\delta) = 0 \\ B_t(j-\delta) = 1 \end{array} \\ \theta_{ms}(j) & ; P(j-\delta) = 1 \end{cases} \quad (19)$$

When P(j)=0, errors are considered to be unlikely, and when P(j)=1, errors are considered to be likely. R is set equal to 1 for a signal referenced error predictor or equal to $$1/\sqrt{\frac{E_b}{N_1}}$$

for a noise referenced error predictor and Δ is adjusted to a value that maximizes system performance.

The system of this invention may be used with particular advantage for the demodulation of binary data strings which have been encoded prior to transmission. In a coded system each successive group of k bits is encoded as a single word, n bits in length (where n>k). Orthogonal or bi-orthogonal codes normally are utilized for this purpose. The delay between the determination of the phase of the transmitted signal in accord with the transmitted bit and the subsequent determination δ bit periods later of the frequency of the transmitted signal is increased to encompass an entire n-bit word. After detection of the received bits, the arithmetic logic processor selects the word, consisting of n bits, which exhibits the largest positive correlation with the received string of n bits as being the received word and then generates the corresponding decoded set of k bits as the output. The decoded word is re-encoded and the re-encoded bits are then used to determine the sequence of channel selection during the reception of the following word, thus taking advantage of the error reduction exhibited by the redundant coding system.

For coded CFPSK, the preferred embodiment of the error predictor is based on the ratio of the correlation between the received word of n bits, to the correlation which would have been obtained if no errors were present. Whenever this ratio falls below a specified threshold, errors are considered likely and the demodulation process is altered accordingly.

An error predictor for coded CFPSK can also be based on the difference between the two largest correlations of the n received bits with the various code words. Whenever the difference in these two correlations is less than a specified threshold, errors would be considered likely.

Figure 6:
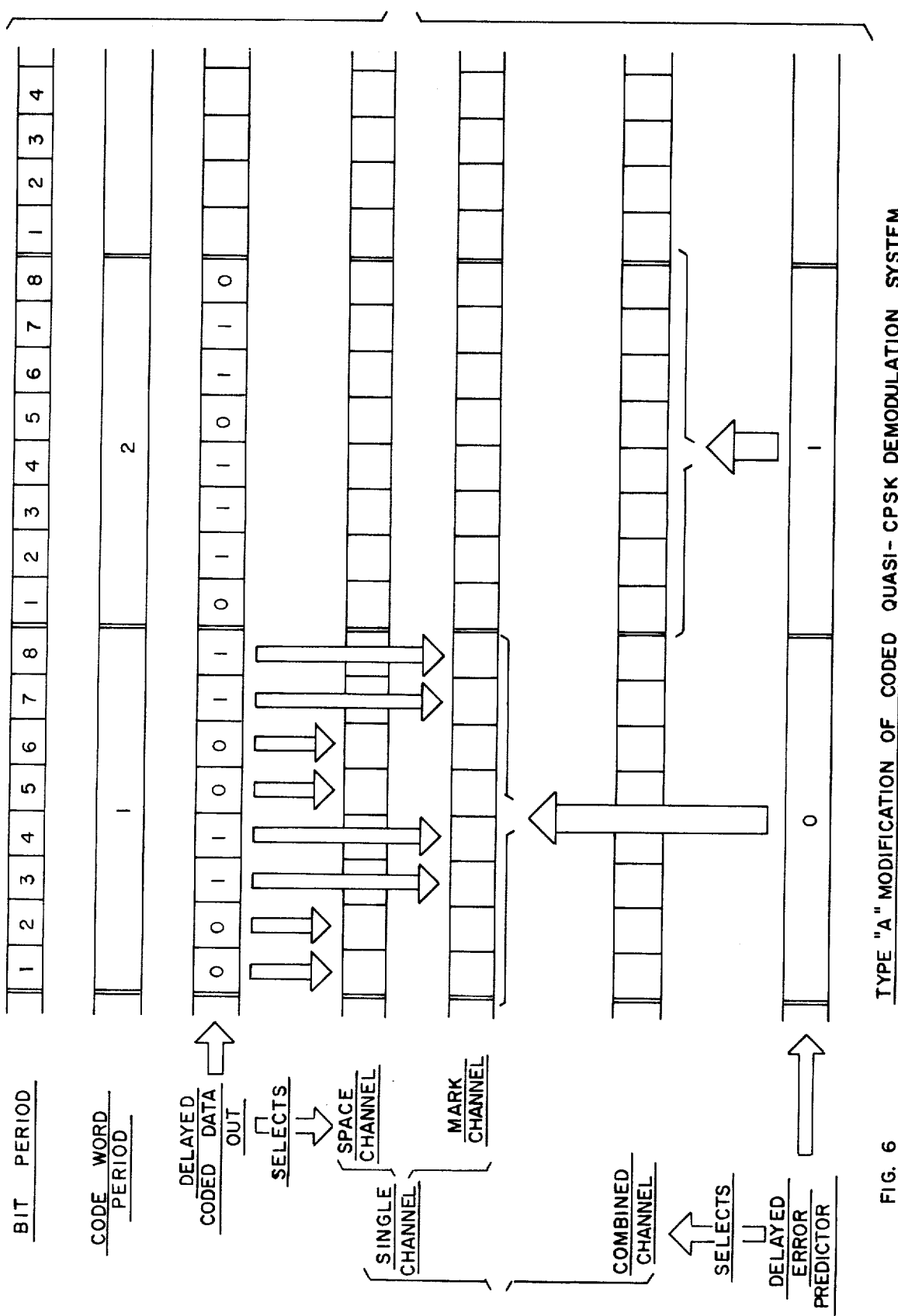
FIG. 6 illustrates the operation of the type "A" modification of the mark/space channel selector for coded CFPSK which may be used in the system of the invention when errors are likely.

When a significant number of errors are expected, the system for the demodulation of coded CFPSK is modified to reduce the effects of such errors. One modification method is similar to the uncoded type "A" modification previously described and is illustrated in FIG. 6. In the coded type "A" modulation, when errors are likely, the space and mark channels are combined to yield the words consisting of n bits, which are then decoded to provide the output data stream.

Figure 7:
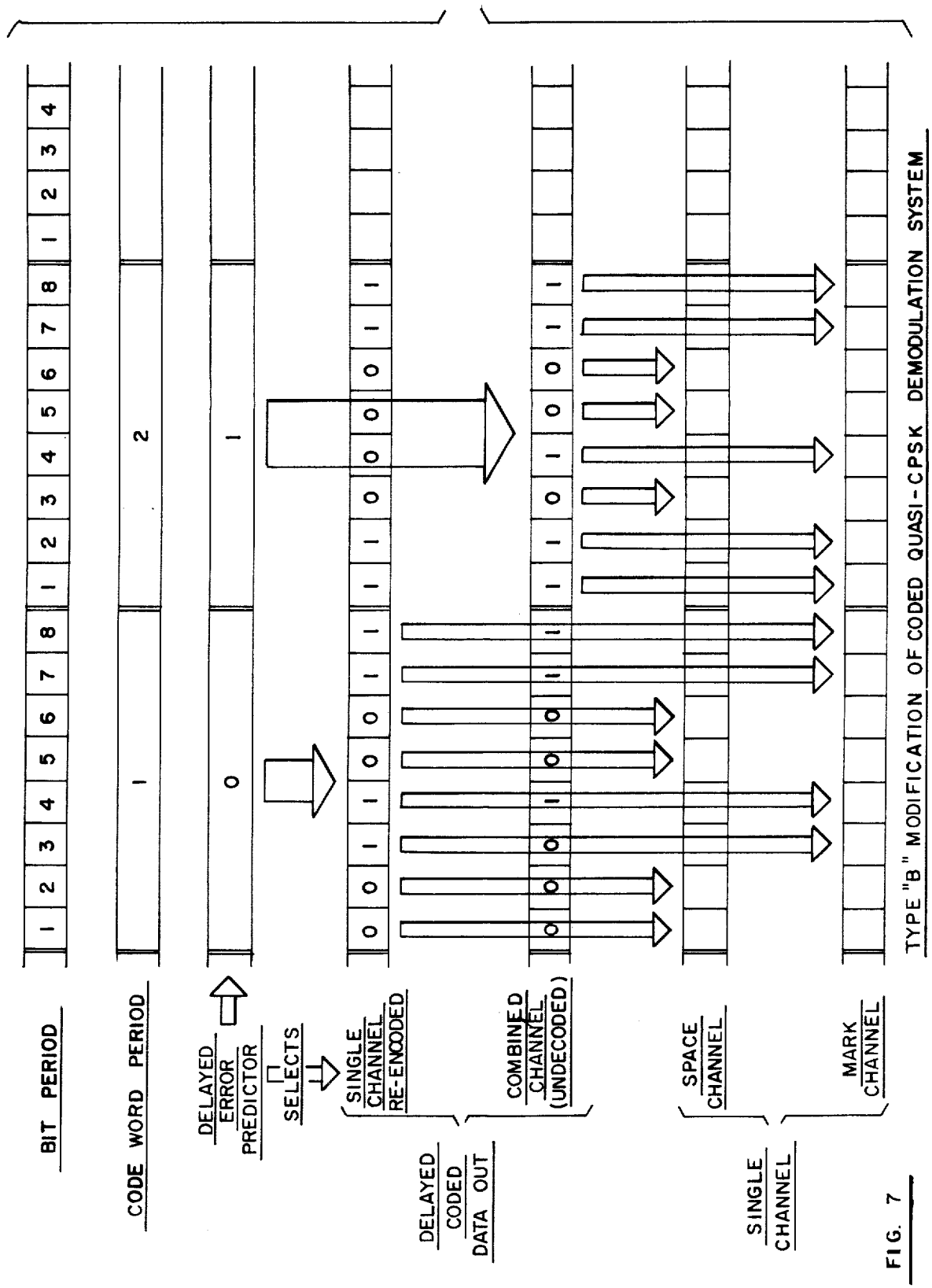
FIG. 7 illustrates the operation of the type "B" modification of the single/combined channel demodulator of coded CFPSK which may be used in the system of the invention when errors are likely.

A different modification, similar to the uncoded type "B" modification, could be used instead. As illustrated in FIG. 7, whenever errors are likely, the space and mark channels would be combined, detected, and decoded as in the type "A" modification. However, this data would then be re-encoded, delayed and used to select either the space or mark channel whose output would then be detected and decoded to provide the output data. Thus, in the coded type "B" modification, the output of only a single channel at a time would be used always to generate the output data, although when errors are likely, the combined channels would be used to select which sequence of single channels is to be used to generate the output.

While this invention has been described and illustrated in detail, it is to be clearly understood that this description is intended by way of illustration and example only and is not to be taken by way of limitation, the spirit and scope of this invention being limited only by the terms of the following claims.

I claim:

1. A system for use in the modulation of binary digital data on an electromagnetic carrier and the demodulation of said data from said carrier, comprising:
   modulator means for effecting both coherent frequency and phase shift keying of said carrier in accordance with said data,
   first demodulator means for quasi-CPSK demodulating the phase shifted carrier components representing the data from said carrier,
   second demodulator means for NCFSK demodulating the frequency shifted carrier components representing the data from said carrier,
   error predictor means for determining when said first or second demodulator means has an unacceptable error rate, and
   means responsive to said error predictor means for selecting the output of the other one of said demodulating means as the demodulated output of said system whenever the current demodulating means has an unacceptable error rate.

2. The system of claim 1 wherein the quasi-CPSK demodulation means also comprises first uncoded modification means (A) for combining space and mark frequencies prior to phase detection of the binary digital data, and means for selecting said first uncoded modification means (A) when errors are likely.

3. The system of claim 1 wherein the quasi-CPSK demodulation means also comprises second uncoded modification means (B) for the selection of space or mark frequencies for phase detection of the data by the combining of the space and mark frequencies prior to detection, and means for selecting the second uncoded modification means (B) when errors are likely.

4. The system of claim 1 wherein modulation means includes coding means, and the demodulating means includes decoding and re-encoding means.

5. The system of claim 4 wherein quasi-CPSK demodulation means also comprises first coded modification means (A) for combining space and mark frequencies prior to phase detection of binary digital data, and means for selecting first coded modification means (A) when errors are likely.

6. The system of claim 4 wherein quasi-CPSK demodulation means also comprises second coded modification means (B) for selecting space or mark frequencies for phase detection of the data in accord with the re-encoded, decoded output of the combined space and mark frequencies and means for selecting the second coded modification means (B) when errors are likely.

* * * * *